Feb. 13, 1962     B. R. TURNER     3,020,985
SECTIONAL TOWER MEANS
Filed June 26, 1958     4 Sheets-Sheet 1
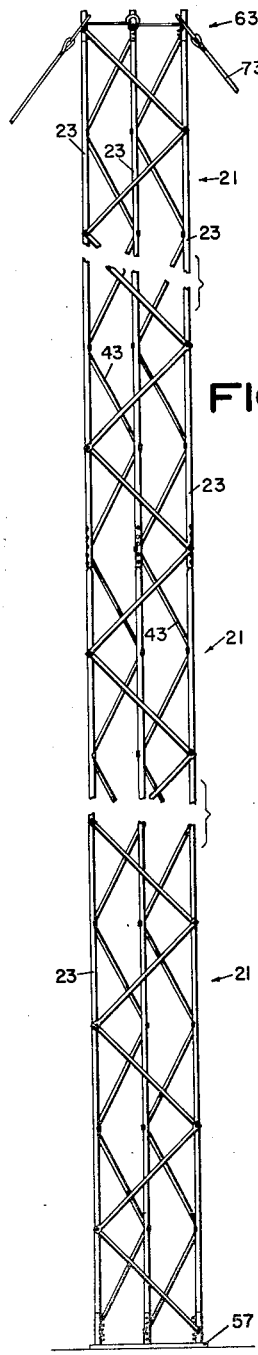
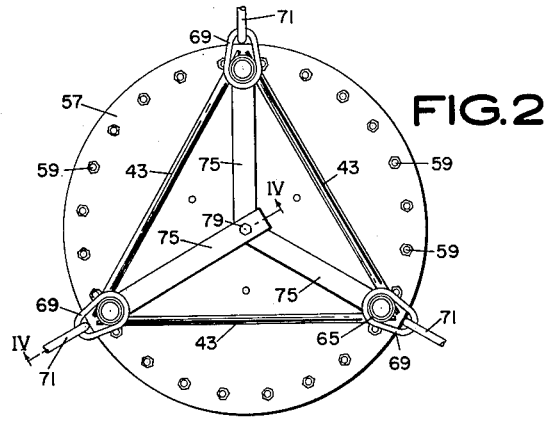
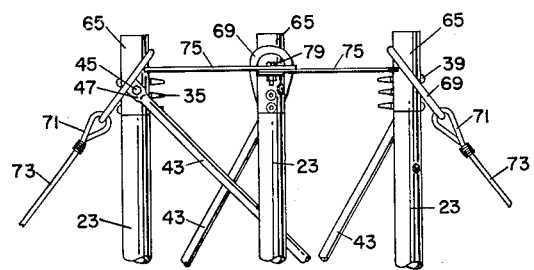
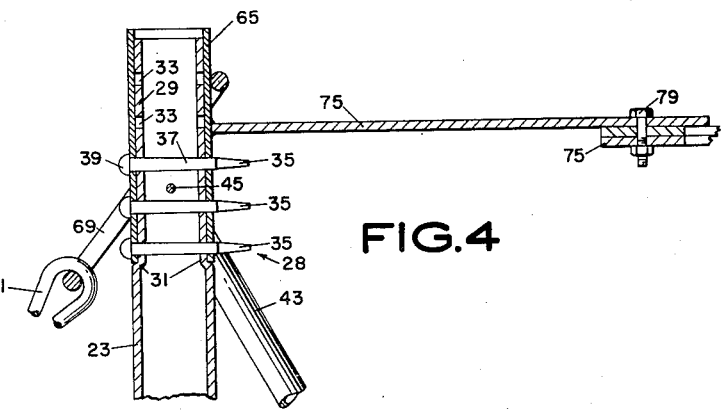
*INVENTOR,*
Benjamin R. Turner
BY Feb. 13, 1962 B. R. TURNER 3,020,985
SECTIONAL TOWER MEANS
Filed June 26, 1958 4 Sheets-Sheet 2

INVENTOR,
Benjamin R. Turner
BY
Weatherford & Weatherford
Attys

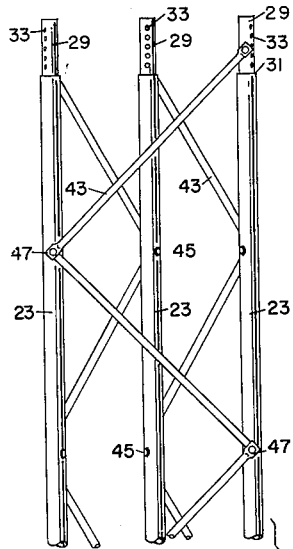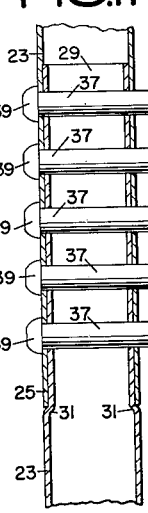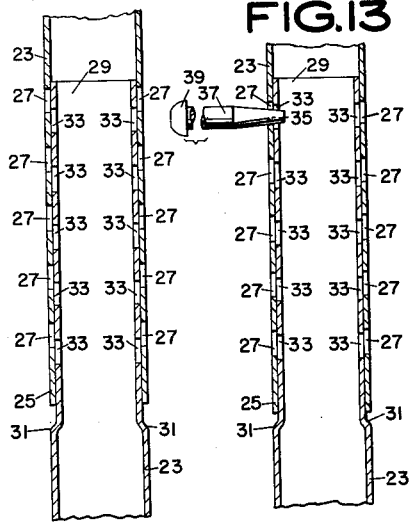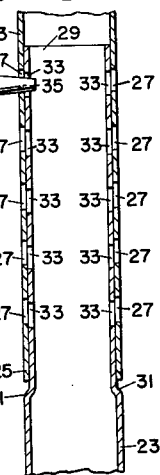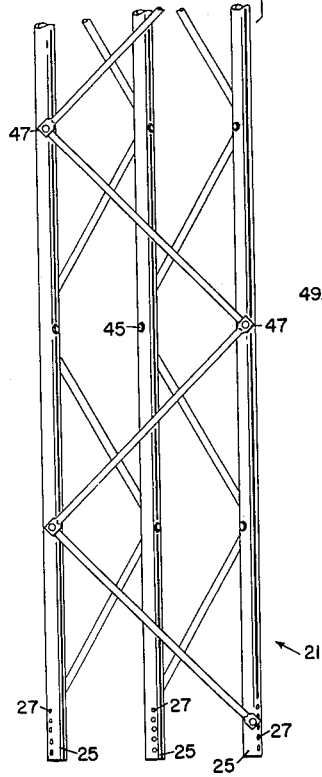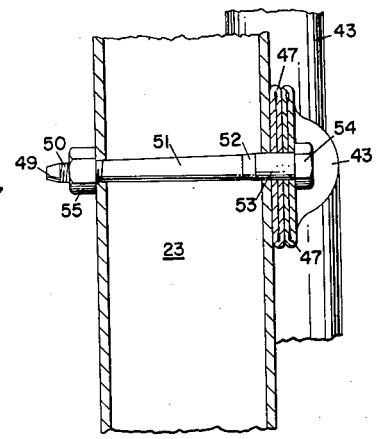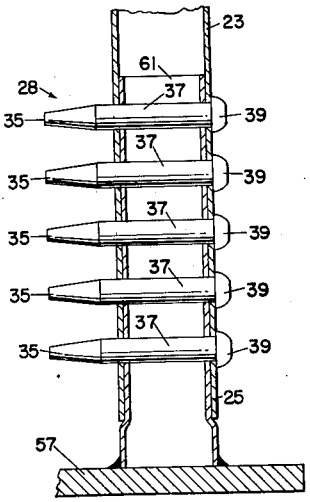

Feb. 13, 1962 B. R. TURNER 3,020,985
SECTIONAL TOWER MEANS
Filed June 26, 1958 4 Sheets-Sheet 4

INVENTOR,
Benjamin R. Turner
BY Weatherford & Weatherford
Attys

United States Patent Office 3,020,985
Patented Feb. 13, 1962

3,020,985
SECTIONAL TOWER MEANS
Benjamin R. Turner, Memphis, Tenn., assignor to Rohn Manufacturing Company, Peoria, Ill., a corporation of Illinois
Filed June 26, 1958, Ser. No. 744,694
4 Claims. (Cl. 189—19)

This invention relates to certain new and useful improvements in means for providing tower-like structures, and in particular relates to such means which are adapted to provide sectional tower structures for facilitating in large part the prefabrication and arrangement of the tower structure to reduce the time of erection and construction.

This structure is of the type best adapted for use in antenna towers, as for example in connection with television, radio and similar usage. Previous structures utilized as for antenna towers have exhibited defects in erection and have proven in use to be unstable, this instability being in large measure due to defects and difficulties in jointing and in failure satisfactorily to provide for attachment of guy cables for bracing and assisting in the support of such structure. The present invention contemplates the provision of a simple, durable and efficient structure with a superior arrangement for the interconnection and the securing of the joints as well as a superior means for connecting guy cables to a tower employing the present invention.

The principal object of the present invention is to provide a new and novel tower structure.

A further object of the invention is to provide such means comprising a plurality of superposed and interconnected sections.

A further object of the invention is to provide a new and novel joint for such sections together with new and novel means for fixing the section joints in jointed condition.

A further object of the invention is to provide sections for tower structure means having jointed ends which are telescopically nested.

A further object of the invention is to provide such a structure with new and novel drive pin means effecting fastening of telescopically nested joint ends.

A further object of the invention is to provide such tower structure with new and novel guy brackets for the attachment of guy cables to the tower structure.

A further object of the invention is to provide such guy brackets which each comprise a collar adapted to engage an uppermost section joint end nipple, link means rigidly fixed to such collar and projecting therefrom, and plate means rigidly fixed to and projecting perpendicularly from such collar means.

A further object of the invention is to provide such a tower structure, which includes a plurality of such guy brackets with the plate means of each of the guy brackets interconnected with the plate means of the other guy brackets; and A further object of the invention is generally to improve the design, construction and efficiency of sectional tower structure means.

The means by which the foregoing and other objects of the present invention are accomplished and the manner of their accomplishment will be readily understood from the following specification upon reference to the accompanying drawings, in which:

FIG. 1 is a fragmentary front elevational view of a tower structure embodying the means of the present invention.

FIG. 2 is a fragmentary top plan view on an enlarged scale of the tower as shown in FIG. 1.

FIG. 3 is a fragmentary front view illustrating details of the arrangement of the top of the tower.

FIG. 4 is a fragmentary sectional view on a further enlarged scale taken as on the line IV—IV of FIG. 2, the drive pins being shown in elevation.

FIG. 10 is a fragmentary elevational view on a somewhat reduced scale of a typical tower section.

FIG. 11 is a fragmentary vertical sectional view illustrating a completed joint between tower sections on a scale enlarged relative to that of FIG. 10, with drive pins shown in elevation.

FIG. 12 is a view similar to FIG. 11 illustrating the joint before fastening.

FIG. 13 is a view similar to FIG. 11 illustrating the joint in the course of fastening.

FIG. 14 is a fragmentary vertical sectional view illustraing the joint between a tower section and a base plate, with drive pins shown in elevation.

FIG. 15 is a fragmentary sectional view on a somewhat enlarged scale illustrating details of cross brace fastening, with the brace bolt shown in elevation.

Figure 5:
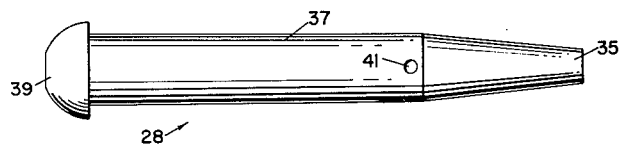
FIG. 5 is an elevational view of a preferred embodiment of drive pin used in the present invention.

Referring now to the drawings in which the various parts are indicated by numerals, it will be seen that the present invention contemplates the provision of an elongated tower structure made up of a plurality of tower sections 21. Each of the tower sections 21 comprises a plurality of legs 23, preferably three in number, which are in equally spaced positions so as to define an approximately equilateral triangular area. Legs 23 are preferably formed from hollow metallic tubing and are disposed in parallel relationship. Each of tower legs 23 at its lower end is downwardly open providing a cylindrical joint end socket 25, each joint end socket 25 being provided with diametrically opposed series of equally spaced apertures 27 arranged longitudinally along the joint end socket and adapted to receive the drive pins 28 hereinafter to be described.

At their respective upper ends, tower legs 23 are swaged to provide a cylindrical reduced diameter upper joint end nipple 29, which is adapted to snugly and slidably fit within a lower joint end socket 25 of a superposed tower section 21. Reduced joint end nipple 29 of each of the legs 23 terminates at its lower extremity in a shoulder 31 to provide a seat for limiting the relative movement downwardly of a superposed joint end socket during construction and use of the device.

Each of the reduced joint end nipples 29 is provided with diametrically opposed series of apertures 33, which are arranged and spaced similarly to the arrangement and spacing of apertures 27 and which are adapted upon seating the superposed tower section 21 and the telescopic nesting of a joint end nipple 29 within a joint end socket 25 to move into register with apertures 27 for the further reception of drive pins 28.

Drive pins 28 preferably include a guide tip 35 which is formed as a tapered frusto-conical portion and is adapted to assist the drive pin in lining up joint end apertures in completing the fastening of joints between sections by the telescopic nesting of leg sockets with leg nipples. Guide tip 35 at its base joins with one end of the body 37 of the drive pin, the diameter of the drive pin at the junction between guide tip 35 and body 37 being substantially equal to the diameter of apertures 27, 33 in the respective leg joint ends. Body 37 extends away from guide tip 35 and at its opposite end is provided with a drive head 39. From tip 35 to head 39, body 37 is formed as a gradually enlarging portion so that the diameter of the body at its junction with head 39 is somewhat greater than the diameter of the body at its junction with tip 35.

In order to interconnect successive tower sections 21, the lower end socket of each tower leg 23 is nested over the upper end nipple 29 of the section next below. In view of the snug fit, frequently in this initial nesting the socket does not firmly seat onto the nipple resulting in a condition such as is illustrated in FIG. 12. The socket and nipple may be forced into a position in which the respective apertures 27, 33 are partly in register such as the condition shown in FIG. 13, and a first drive pin 28 may be introduced to a selected aperture of each of the series preferably being introduced from the outermost portion of the socket and nipple nested therein. The tapered guide tip 35 is of extreme use in further alining the apertures 27, 33, assisting in further forcing the nipple and socket into a position in which the respective apertures are in register at which time the lower end of the socket 25 is seated against shoulder 31 of nipple 29. As drive pin 28 is driven into the registered apertures, the junction of guide tip 35 with body 37 reaches the first registered apertures and snugly engages therein. Further driving of the pin into its final seated position, such as is shown in FIG. 11, causes the enlarging body 37 to radially force the material of the socket and nipple surrounding the aperture and to cause the drive pin tightly to frictionally engage the socket and nipple firmly locking the drive pin in position. Body 37 of drive pin 28 is of a length somewhat in excess of the diameter of socket 25 so as to enable the drive pin to span across the nested socket and nipple with guide tip 35 projecting beyond the wall of socket 25. If desired, the drive pin may be provided with an opening 41 for receiving a suitable key such as a cotter key or the like. It is found, however, in most instances that use of such keys is unnecessary in view of the efficient locking which is accomplished by the drive pin per se and its engagement with the material of the socket and nipple. Preferably at each of the joints between sections, a plurality of drive pins are employed providing a jointed interconnection between successive tower legs 23, mounting the legs in longitudinal alinement and resulting in a joint of great stability and efficiency in which shearing is substantially completely prevented.

Figure 6:
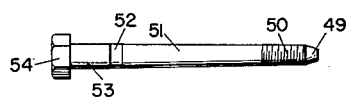
FIG. 6 is an elevational view of a preferred embodiment of a cross brace bolt.
Figure 7:
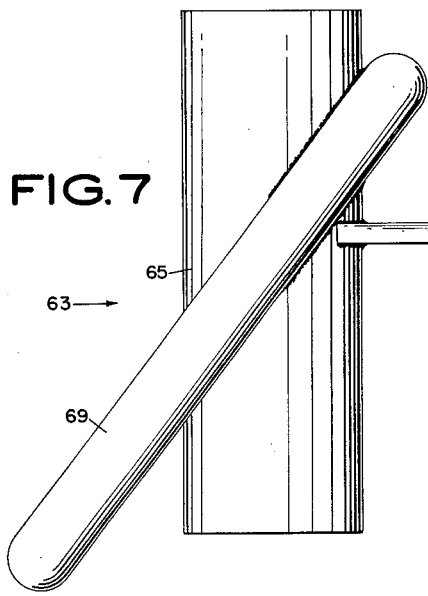
FIG. 7 is a side elevational view of a preferred embodiment of the guy bracket of the present invention with the plate broken off.
Figure 8:
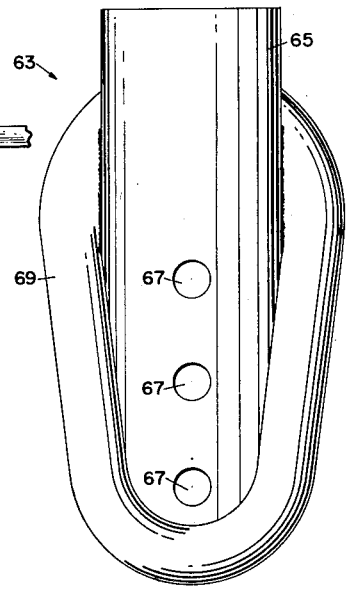
FIG. 8 is a front elevational view of the guy bracket of FIG. 7.

The legs of each tower section 21 are held together by a plurality of diagonally disposed cross braces 43, cross braces 43 being fixed to legs 23 by means of bolts 45 preferably of the type shown in FIG. 6. Cross braces 43 are preferably formed from tubular material and are each provided at opposite ends with flattened end portions 47, these flattened portions 47 being apertured to receive bolt 45. Legs 23 are provided with longitudinally alined and spaced apart single apertures for receiving bolts 45 and accomplishing fastening of cross braces 43 to legs 23, the alinement of these bolt apertures being circumferentially spaced from the longitudinal alinement of apertures 27, 33.

Each bolt 45 is preferably provided with a minor tapered tip 49 extending from one end of a threaded portion 50, the other end of threaded portion 50 being connected to the main body 51 of bolt 45 which is a gradually enlarging portion and, at its opposite end, main body 51 joins a more sharply tapered section 52 which lies between body 51 and an enlarged end section 53, a bolt head 54 being mounted on the other end of end section 53.

In connecting the cross braces 43 to legs 23, successive pairs of legs 23 are interconnected by the series of cross braces. Successively pairs of braces are brought into register with the bolt hole apertures formed in leg 23 and one of the cross braces of the pair is extended diagonally downwardly to span diagonally to the other leg 23 of the pair and the other cross brace is diagonaled upwardly to span the opposite leg. With the apertures in the brace ends registered with the apertures in the legs, a bolt 45 is introduced and extended to fasten the brace ends to leg 23. The enlarging shape of bolt 45 effectively locks the body of the bolt into the leg and a suitable nut 55 may be applied to the projecting threaded portion 50.

In the prefabrication of the successive tower sections 21, the uppermost and lowermost of cross braces 43 which are adapted to be attached to the lower end socket 25 and upper end nipple 29 of the leg are left unattached in order not to interfere with the nesting of the socket and nipples in the assembly of the device, and are attached by bolts 45 after the sections are assembled together, thus adding additional strength to the interconnection between the sections and transmitting strains diagonally along the cross braces to others of the legs in the respective sections.

In order to provide a support for the tower structure of the present invention, it is preferred that a base plate 57 be provided. This base plate may be formed in any suitable shape, although it is preferred that it be circular, as best shown in FIG. 2. The base plate 57 is adapted to be secured as by bolts 59 to a subsurface means such as a concrete block or the like (not here shown) in order firmly to secure the base plate in position. Mounted upon and extending vertically upwardly from base plate 57 is a plurality of nipples 61 which equal in number of legs 23 included in the tower section 21 to be mounted upon the base plate. Nipples 61 are substantially equal in size and shape to leg nipples 29 heretofore described, and are provided with longitudinally alined series of diametrically opposed apertures for the reception of drive pins 28 for the attachment of the lower end socket 25 of the lowermost tower section 21 of the tower structure in manner as best shown in FIG. 14. The connection between such lowermost socket 25 and a base plate nipple 61 involving drive pins 28 is similar to that already described in which the shape and size of the drive pins and their arrangement relative to the material of the socket and nipple effectively lock the drive pins in position and form a stable joint between the leg and the base plate nipple. Nipples 61 are rigidly and preferably integrally secured to base plate 57 as by welding as also is shown in FIG. 14.

In order to prevent swaying of the tower structure of the present invention, which is a relatively elongated structure and is subject to substantial swaying strains under the influence of weather conditions such as wind and the like, it is desirable that guy cables be attached to the structure adjacent or near the upper end thereof. It has heretofore been found that the mere attachment of guy cables to portions of tower structures does not accomplish in full the purpose of supporting and maintaining tower structures against the sway created by natural conditions, and in particular there has been heretofore a tendency to concentrate the individual strains upon a given guy cable to a separate portion of prior tower structures without attempt to transmit these strains to other portions of the tower structure. In order to meet this problem the present invention contemplates the utilization of the new and novel guy brackets 63 to provide a means for receiving the connection of suitable guy cables and for attaching the same to the upper end of the tower structure.

Each of guy brackets 63 comprises a cylindrical collar 65 which is dimensioned to fit snugly and slidably over the uppermost tower leg nipple 29. Collar 65 is provided with diametrically opposed series of apertures 67 which are adapted to register with at least a part of the series of apertures 33 in the uppermost nipple 29 of the tower structure, and like the apertures 25 are adapted to receive drive pins 28 for the fixing of guy brackets into position on the uppermost ends of the tower legs 23.

Figure 9:
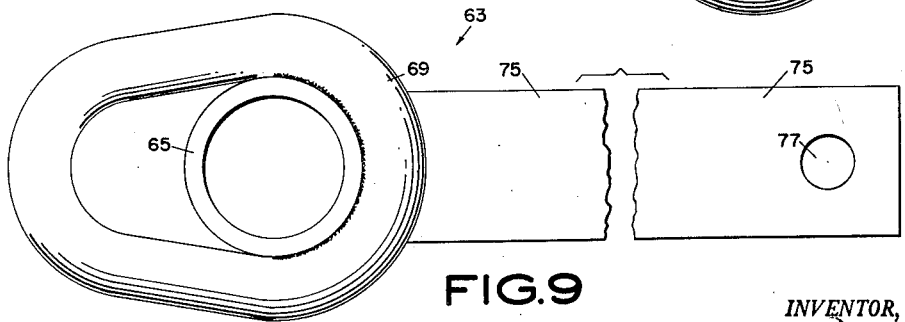
FIG. 9 is a top plan view of the guy bracket of FIG. 7 and FIG. 8, with parts broken away for purposes of illustration.

Rigidly fixed to collar 65, and extending diagonally downwardly and outwardly across the collar 65, is a link 69, preferably formed as a substantially complete loop, which at its inner portion embraces a part of the external periphery of collar 65, and the attachment thereof to collar 65 is preferably accomplished as by welding. Link 69 at its outer portion is spaced away from the periphery of collar 65 as best shown in FIG. 9 and is adapted to receive the attaching eye 71 of a suitable guy cable 73. Link 69, as stated, extends downwardly across collar 65, and to the inner portion of the periphery of collar 65 below the inner extremity of link 69 an inwardly extending plate 75 is fixed in perpendicular relationship to collar 65, the attachment being accomplished also preferably by welding. Plate 75 extends inwardly and at its inner end is provided with a suitable opening 77 which is adapted to register with similar openings 77 in other plates 75 of the tower structure and to receive therethrough an attachment bolt 79.

In the mounting of a guy bracket 63 on the tower structure, collar 65 is seated on the uppermost nipple 29 and is moved down into engagement with the nipple, with the apertures 77 of the collar moved into register with at least a part of the apertures 33 in the nipple. With the bracket thus positioned link 69 extends diagonally downwardly and outwardly from the collar, and plate 75 extends radially inward from the collar toward the vertical center of the tower structure. Drive pins 28 may then be driven into position to fix collar 65 to the uppermost nipple 29, as best shown in FIG. 4.

Similarly, other guy brackets 63 are mounted upon the remaining legs of the tower structure and are fixed into position with their respective plates 75 extending radially inwardly. With the guy brackets thus fixed to the legs, attachment bolt 79 is positioned to extend through the registering apertures 77 in plates 75 of the several guy brackets employed, and the bolt 79 is fixed in place, a suitable nut being affixed thereto.

In some circumstances a variation of the guy bracket may be employed. In this connection it should be remembered that the tower structure of the present invention may be provided with legs which are spaced apart varying distances. Thus in some installations the legs may be spaced apart of the nature of 36 inches. These spacings may vary therefrom downwardly to a spacing of the nature of 12 inches. The leg spacings are largely dependent upon the altitude of the tower to be built and employed, and it is found that under certain conditions variations may be applied to the guy brackets for the securing of guy cables.

Figure 16:
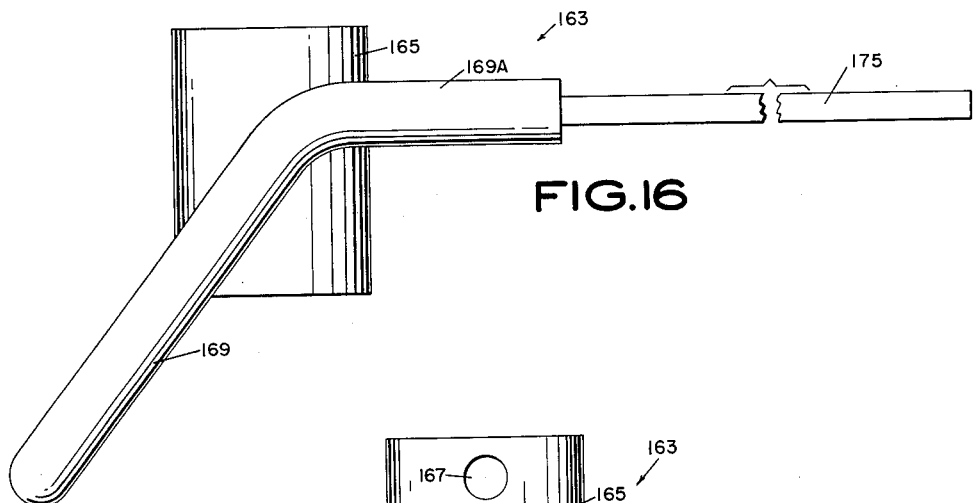
FIG. 16 is a side elevational view of a variation in guy bracket means with the plate broken out.
Figure 17:
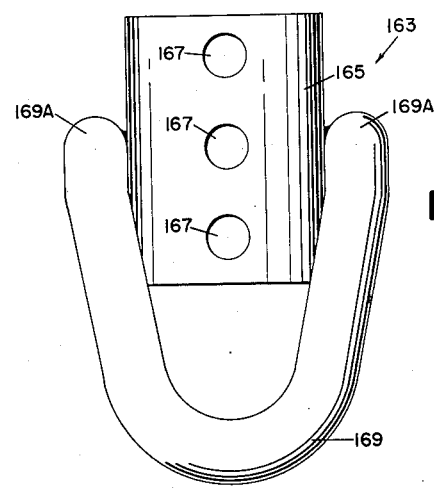
FIG. 17 is a front elevational view of the guy bracket of FIG. 16.
Figure 18:
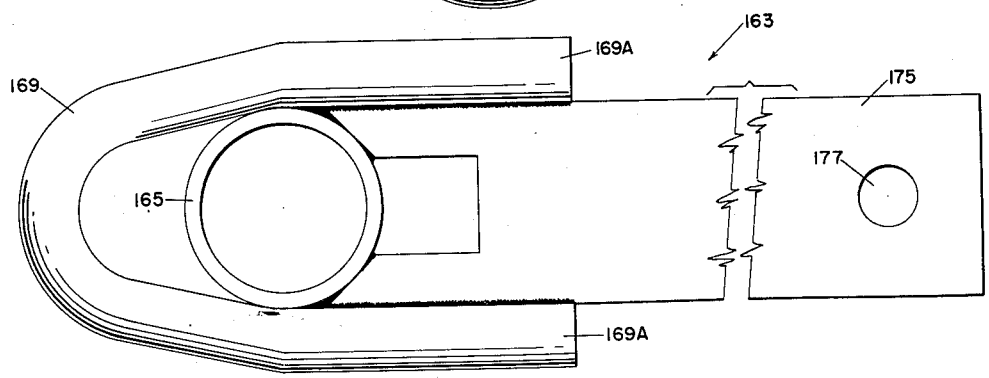
FIG. 18 is a top plan view of the guy bracket of FIGS. 16 and 17.

An alternative form of guy bracket 163 is illustrated in FIGS. 16, 17 and 18, in which there is shown a collar 165 which is adapted to nest over an uppermost nipple 29 of a tower leg 23 and is provided with apertures 167 for the reception of suitable drive pins 28. To collar 165 is rigidly fixed, preferably as by welding, a link 169 which extends downwardly and outwardly from collar 165, but which is provided with arms 169A which extend inwardly alongside the edges of a plate 175, plate 175 being rigidly and perpendicularly secured to collar 165 and extending radially inwardly therefrom, the plates being provided with a suitable aperture 177 for reception of a bolt 79. Link arms 169A extend alongside plate 175 and are rigidly secured thereto, preferably as by welding. This varied guy bracket 163 may be utilized similarly to brackets 63 as hereinabove described, with collars 165 being successively mounted upon the uppermost nipples 29 of the uppermost legs to the tower structure, drive pins 28 positioned to fix the collar to the leg nipple, with links 169 extending diagonally downwardly and outwardly from the collars, and with plates 175 extending radially inwardly, positioning apertures 177 in register substantially at the vertical center line of the tower structure. With brackets 163 thus positioned a bolt 79 may be extended through the registering apertures 177 and fixed in position as by a suitable nut.

In the erection of the structure, the successive tower sections 21 may be brought into alinement, with the leg sockets 25 nested over leg nipples 29 and with the lowermost leg sockets 25 nested over base plate nipples 61. The sockets and nipples may then be fixed into relative position by the utilization of drive pins 28, the endmost cross braces of each tower section 21 fixed in position, and the tower thus is substantially erected. Guy brackets 63, or in the alternative, guy brackets 163, may be mounted on the uppermost leg nipple 29 and secured in position by drive pins 28, with guy cable eyes 71 respectively fixed to the lowermost portion of the diagonally downwardly and outwardly extending extremities of the guy bracket links. With the fixtures thus attached in position the guy cables connected with attachment eyes 71 may be extended downwardly and outwardly from the tower and brought into proper tension by a fastening to the ground or other fastening surface, not shown.

It will thus be seen that the present invention presents a tower structure of a sectional nature which may largely be prefabricated and which may quickly and simply be mounted together to provide a highly stable tower structure. It is found that, in virtue of the plates extending inwardly from the guy brackets and mutually secured together substantially centrally of the tower structure in the manner as described, strains exerted by the guy cables or upon the guy cables are transmitted not only to the one leg to which the guy cable is substantially attached by its related guy bracket, but are also transmitted to the remaining legs of the structure in order better to equalize these strains and substantially to prevent undue tension being exerted upon an isolated portion of the tower structure.

I claim:

1. In a tower structure comprising an upright elongated framework having a plurality of upright legs, and guy cables for maintaining said structure in upright condition, a like plurality of guy brackets connecting said cables to said structure; each said bracket including a collar fitted around a tower leg adjacent the upper end of said leg, a link rigidly secured to said collar and extending diagonally downwardly and outwardly from said collar, said link embracing said collar and the leg on which said collar is fitted, and at its lower and outer portion being spaced away from said collar, said lower and outer portion being connected to a guy cable, a plate rigidly and perpendicularly secured to said collar adjacent said link and extending inwardly from said collar; the plates of said brackets being positioned with their inner ends in overlapping register substantially at the vertical center line of said structure and adjacent the top of said structure; and means attaching said overlapping inner plate ends to interconnect said brackets for transmission of strains from one bracket to another of said brackets.

2. In a tower structure comprising an upright elongated framework having a plurality of upright legs, and guy cables for maintaining said structure in upright condition, a like plurality of guy brackets connecting said cables to said structure; each said bracket including a collar fitted around a tower leg adjacent the upper end of said leg, a link rigidly secured to said collar and extending diagonally downwardly and outwardly from said collar, said link embracing said collar and the leg on which said collar is fitted, and at its lower and outer portion being spaced away from said collar, said lower and outer portion being connected to a guy cable, a plate rigidly secured to said collar adjacent said link and extending substantially horizontally inwardly from said collar; the plates of said brackets being positioned with their inner ends in overlapping register substantially at the vertical center line of said structure and adjacent the top of said structure; and means attaching said overlapping inner plate ends to interconnect said brackets for transmission of strains from one bracket to another of said brackets.

3. In a tower structure comprising an upright elongated framework having a plurality of upright legs, and guy cables for maintaining said structure in upright condition, a like plurality of guy brackets connecting said cables to said structure; each said bracket including a collar fitted around a tower leg adjacent the upper end of said leg, a link rigidly secured to said collar and extending outwardly from said collar, said link embracing said collar and the leg on which said collar is fitted, and at its outer end being spaced away from said collar, a said guy cable being connected to said outer portion, a plate rigidly secured to said collar adjacent said link and extending inwardly from said collar; the plates of said brackets being positioned with their inner ends in overlapping register substantially at the vertical center line of said structure and adjacent the top of said structure; and means attaching said overlapping inner plate ends to interconnect said brackets for transmission of strains from one bracket to another of said brackets.

4. In a tower structure comprising an upright elongated framework having a plurality of upright legs, and guy cables for maintaining said structure in upright condition, a like plurality of guy brackets connecting said cables to said structure; each said bracket including means engaging a tower leg adjacent the upper end of said leg, a link rigidly secured to said leg-engaging means and extending outwardly therefrom, said link embracing said means and the leg engaged by said means, and at its outer end being spaced away from said collar, a said guy cable being connected to said outer portion, a plate rigidly secured to said leg-engaging means adjacent said link and extending inwardly therefrom; the plates of said brackets being positioned with their inner ends in overlapping register substantially at the vertical center line of said structure and adjacent the top of said structure; and means attaching said overlapping inner plate ends to interconnect said brackets for transmission of strains from one bracket to another of said brackets.

References Cited in the file of this patent

UNITED STATES PATENTS

| | | |
|---|---|---|
| 2,410,246 | Scrivener et al. | Oct. 29, 1946 |
| 2,728,555 | Burg et al. | Dec. 27, 1955 |
| 2,739,673 | Foster | Mar. 27, 1956 |
| 2,806,560 | Cox | Sept. 17, 1957 |

FOREIGN PATENTS

| | | |
|---|---|---|
| 322,662 | Italy | Nov. 20, 1934 |
| 543,165 | Great Britain | Feb. 12, 1942 |